(12) United States Patent
Westarp et al.

(10) Patent No.: US 11,760,513 B2
(45) Date of Patent: Sep. 19, 2023

(54) FILLING UNIT AND METHOD FOR FILLING CONTAINERS

(71) Applicant: HAVER & BOECKER OHG, Oelde (DE)

(72) Inventors: Christian Westarp, Oelde (DE); Dieter Schwippe, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 180 days.

(21) Appl. No.: 17/279,452

(22) PCT Filed: Sep. 24, 2019

(86) PCT No.: PCT/EP2019/075679
§ 371 (c)(1),
(2) Date: Mar. 24, 2021

(87) PCT Pub. No.: WO2020/064713
PCT Pub. Date: Apr. 2, 2020

(65) Prior Publication Data
US 2022/0033114 A1 Feb. 3, 2022

(30) Foreign Application Priority Data
Sep. 28, 2018 (DE) ...................... 10 2018 124 119.4

(51) Int. Cl.
*B65B 1/48* (2006.01)
*B65B 1/22* (2006.01)
(Continued)

(52) U.S. Cl.
CPC .................. *B65B 1/48* (2013.01); *B65B 1/22* (2013.01); *B65B 57/145* (2013.01); *G01F 23/265* (2013.01)

(58) Field of Classification Search
CPC ........... B65B 1/48; B65B 1/22; B65B 57/145; G01F 23/265
(Continued)

(56) References Cited

U.S. PATENT DOCUMENTS 3,094,213 A * 6/1963 Wyman ................. B07C 5/3404
209/524
4,015,645 A 4/1977 Chamberlin
(Continued)

FOREIGN PATENT DOCUMENTS

CH 688139 A5 5/1977
CN 104039653 A 9/2014
(Continued)

*Primary Examiner* — Robert F Long
*Assistant Examiner* — Xavier A Madison
(74) *Attorney, Agent, or Firm* — Pearne & Gordon LLP; Bryan M. Gallo

(57) ABSTRACT

Filling unit (1) for a packaging machine (100) for filling bulk materials (50) into packages (60), and packaging machine with a filling unit (1), comprising a conveyor device (2), by means of which bulk materials (50) can be conveyed into a package (60), and a control device (3), which is suitable and configured to guide a filling stream (4) into a package (60). A fill level sensor device (5) including a sensor device (6) is provided, which is suitable and configured to detect a first fill level (7) and a second fill level (8) of bulk materials (50) in a package (60), wherein the first fill level (7) corresponds to a lower fill level than the second fill level (8). The control device (3) regulates the filling stream (4) by way of the fill levels determined by the sensor device (6). With the method according to the invention, the package is filled until the second fill level is detected. Then the filling stream is reduced until the first fill level is detected. Thereupon the filling stream is increased.

15 Claims, 3 Drawing Sheets

Figure 1:
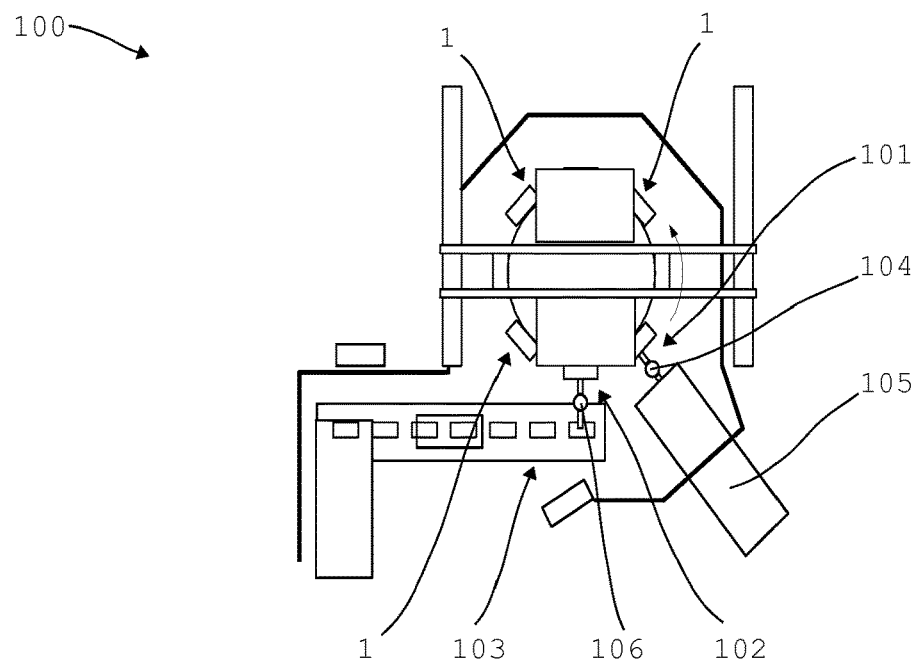

(51) Int. Cl.
  *B65B 57/14* (2006.01)
  *G01F 23/263* (2022.01)
(58) Field of Classification Search
  USPC .......................................................... 53/473
  See application file for complete search history.

(56) References Cited

U.S. PATENT DOCUMENTS

| | | | | |
|---|---|---|---|---|
| 4,182,451 A | * | 1/1980 | Watson | B07C 5/3404 |
| | | | | 209/524 |
| 4,733,095 A | * | 3/1988 | Kurahashi | B67C 3/20 |
| | | | | 250/577 |
| 6,684,609 B1 | | 2/2004 | Bassissi et al. | |
| 8,338,811 B2 | * | 12/2012 | Lang | G01F 23/2925 |
| | | | | 250/577 |
| 9,540,123 B2 | | 1/2017 | Vollenkemper | |
| 9,650,161 B2 | | 5/2017 | Wehling | |
| 10,589,881 B2 | | 3/2020 | Vollenkemper et al. | |
| 2014/0305542 A1 | * | 10/2014 | Vollenkemper | B65B 57/145 |
| | | | | 141/69 |
| 2014/0311623 A1 | | 10/2014 | Wehling | |
| 2017/0291727 A1 | | 10/2017 | Vollenkemper et al. | |

FOREIGN PATENT DOCUMENTS

| | | |
|---|---|---|
| CN | 203996944 U | 12/2014 |
| CN | 106715272 A | 5/2017 |
| CN | 207258028 U | 4/2018 |
| DE | 4336233 A1 | 4/1995 |
| DE | 102006013663 | 9/2007 |
| DE | 102011119451 A1 | 5/2013 |
| WO | 2013079186 | 6/2013 |
| WO | 2018213539 A1 | 11/2018 |

* cited by examiner

FILLING UNIT AND METHOD FOR FILLING CONTAINERS

The present invention relates to a filling unit for a packaging machine for filling bulk materials into packages, comprising at least one conveyor device, by means of which bulk materials can be conveyed into a package, and at least one control device, which is suitable and configured to guide a filling stream into a package. The present invention furthermore comprises a packaging machine including at least one such filling unit, and a method for filling packages with bulk materials by means of such a packaging machine.

The prior art has disclosed a great variety of devices and methods for filling bulk materials into open packages such as open-mouth bags. Also, compaction of the bulk material after or during the filling process is provided, so as to reduce the quantity of required bag material, and to enable better and easier stackability of filled and closed bags.

When filling bulk materials into open-mouth bags or other types of package, a fluid such as air may be added depending on the bulk material, to increase flowability of the bulk material. In the case of very lightweight materials a considerable portion of air tends to be present in the bulk material before filling starts.

For better compaction of bagged bulk materials, vibrating devices disposed external of the package, such as bottom vibrators or external vibrators, have been disclosed. Compaction may be effectively achieved even inside the package, by means of so-called vacuum lances, which enter into an open bag from above during the filling process, aspiring air by way of a vacuum applied to the external lance surface, and removing the air from the interior.

Poker vibrators are also disposed inside the package intended for filling, and thus they can effectively carry out compaction of the bulk material already during the filling process, in filling pauses, or after filling. Combinations of individual or even all of the compaction types are conceivable.

The drawback of all of the methods is, however, that bulk material can only be filled up to a relatively large safety margin beneath the top edge of the open-mouth bag to prevent overflowing. Also, different bulk materials may possibly show extremely different behavior. As a predetermined fill limit showing sufficient distance to the bag opening is reached, compaction follows first in a filling pause, and then filling continues. This extends the filling time of the packages.

Each product requires empirical determination of appropriate filling parameters such as filling time and rotational speed or capacity of a conveyor, wherein relatively large safety margins must be observed so as to also provide for future product changes. This also applies to the filling pauses. Changes to the filling parameters are only feasible by manual operator intervention; otherwise they are identical for each filling.

It is therefore the object of the present invention to provide an apparatus and a method, with which to reliably prevent filling bulk material above permissible levels, and thus to achieve a self-optimizing filling process.

This object is solved by a filling unit having the features of claim 1, by a packaging machine having the features of claim 11, and by a method for filling packages having the features of claim 12. Preferred specific embodiments of the invention are the subjects of the subclaims. Further advantages and features of the invention can be taken from the exemplary embodiments.

The filling unit according to the invention, for a packaging machine for filling bulk material into packages, comprises at least one conveyor device, by means of which bulk material can be conveyed respectively filled into a package, and at least one control device. The control device is suitable and configured to guide at least one filling stream into a package. According to the invention, at least one fill level sensor device including at least one sensor device is provided, which is suitable and configured to capture at least one first fill level and at least one second fill level of bulk materials in a package. The first fill level corresponds to a fill level lower than the second fill level. The control device regulates the filling stream by way of the fill levels determined by the fill level sensor device or the sensor device.

The filling unit for a packaging machine according to the invention in particular provides for filling bulk material from above preferably into open-top packages such as open-mouth bags. In particular granular respectively powdery bulk material can be filled into open-top packages.

According to the invention, a conveyor device is in particular provided in so-called gross systems by means of at least one active conveying member. In so-called net systems, the conveyor device may be provided by a batching device. A batching device may guide previously batched bulk materials to a package, either by means of an active conveying member, or by way of gravity.

Alternately, it is also conceivable to fill liquids or fluids and in particular foaming liquids into open-mouth packages such as canisters, by means of the filling unit according to the invention.

According to the invention, the fill level sensor device or the at least one sensor device of the fill level sensor device may detect at least two different fill levels in the package, wherein the control device regulates the filling stream by way of the fill levels. According to the invention this is in particular understood to mean that the filling stream is activated and/or deactivated.

Thus, it is in particular preferred to guide a filling stream into the package until the second, higher fill level is detected. As soon as the second fill level is detected, the filling stream is interrupted and/or reduced or lowered, so that the bulk material guided into the package may settle, wherein, depending on the configuration, the bulk material in the package is additionally vibrated respectively compacted.

As soon as the bulk material is settled due to the interruption of the filling stream, and the fill level has lowered beneath the second fill level respectively down to the first, lower fill level, the filling stream may be reactivated respectively increased, so that filling the package continues.

The second fill level preferably corresponds to a maximum fill level of the package, which is not, or only just, reached when filling the package with the predetermined weight of bulk material. Among other things, it serves to ensure that the closure region, constituting the region where a welded or glued seam or another type of package seal is intended, remains free of product, depending on the type of package. Then, a reliable package seal can be guaranteed.

In order to enable the at least one sensor device to detect two different fill levels, different configurations of the sensor device can be advantageously employed. For example, in the case of transparent packages, a camera and/or a laser device may be used to detect a first and a second fill level.

However, other sensor types, for example capacitive sensors, likewise allow to determine two different fill levels. In the case of capacitive sensors, for example a percentage value of the still prevailing electric field allows conclusions about different fill levels. For example, a larger electric field forms over the entire height of the sensor surface in contact with an antipole between the sensor and the antipole, the electric field diminishing inversely proportional with the covered area of the sensor surface, respectively with more bulk material accumulating between the sensor and the antipole.

The filling unit according to the invention offers many advantages. It is a considerable advantage that the filling stream into a package can be automatically guided respectively regulated, so as to achieve optimal filling of a package in the shortest time feasible.

To this end, a filling stream is guided into the package until a predefined, maximum fill level is reached. Thereafter one waits for the bulk material in the package to settle, or the bulk material is actively compacted, until the fill level has lowered to the first fill level, which causes the filling stream to restart or to increase.

Thus, a particularly efficient filling of a package can be achieved without having to fear overflow of bulk materials due to too fast or too long filling periods of the package, or due to changes to the bulk density of the bulk material, e.g. as the silo levels decrease.

According to the invention, the output can thus increase compared to known systems, since the system automatically adapts to changing feed material properties. In presetting by product type, safety periods or safety volumes must always be taken into account. Moreover, the start-up time for these systems is reduced, since determining and presetting parameters by product type is eliminated.

Preferably, the sensor device is suitable and configured to monitor at least the head space of a package. Head space is in particular understood to mean the top region of the package. The sensor device is in particular suitable and configured to detect the first and second fill levels in the top 30% of the package, preferably in the top 20%, and in particular in the top 10% of the package. In general it is preferred to achieve optimal filling of a package, wherein in particular the second fill level defines a maximum fill level. It is likewise convenient for the first fill level, that is the lower fill level of the two fill levels, to lie within the top 30%, 20% respectively 10%. Thus, the package can initially be filled at high speed in a so-called high speed flow, and then the operation switches to low speed flow or controlled flow.

Particularly preferably, at least two sensor devices are provided, the first sensor device detecting the first fill level, and the second sensor device detecting the second fill level. Detection of the two fill levels by different sensor devices achieves particularly reliable detecting of the filling stream. Moreover, different configurations may provide for different sensors. In particular in the case of capacitive sensors, using at least two sensor devices is advantageous to regulate a particularly precise and sensitive controlling of the filling stream by way of detecting the fill level.

In convenient configurations, the sensor devices are disposed at angles to one another. What is in particular preferred is to dispose the sensor device according to the shape respectively contour of the packages intended for filling. For example, the first sensor device which detects the first fill level may be disposed substantially horizontal, wherein preferably the second sensor device, which detects the second fill level, is provided for example inclined between 10° and 45°, according to the bag shape. It is in particular preferred for the sensor devices to be disposed the closest possible to the package.

Preferably, at least one sensor device comprises at least one capacitive sensor. If multiple sensor devices are provided, in particular at least two, respectively all, of the sensor devices are configured as, respectively comprise, a capacitive sensor. Using capacitive sensors is advantageous, in particular with non-transparent package walls, where optical sensors cannot be used. Thus, capacitive sensors allow to achieve reliable detecting of the fill levels nearly independently of the material and the quality of the package wall, in particular as long as the package wall does not shield electric fields.

Particularly preferably, at least one vibrating device is provided that is suitable and configured to compact bulk material in a package. Compaction may be done by means of the vibrating device during feeding of bulk material and/or in the filling pauses. The vibrating device used may in particular be a poker vibrator, external vibrator, and/or a bottom vibrator.

In advantageous specific embodiments, a vacuum lance may be provided, which is disposed inside of the package intended for filling, sucking off air at least intermittently, to cause compaction of the bulk material. This vacuum lance may preferably also cooperate, or be configured in combination, with another vibrating device, and in particular in combination with a poker vibrator.

In convenient specific embodiments, the vibrating device and/or the vacuum lance form at least one antipole to the at least one capacitive sensor. Preferably, the vibrating device is, at least in sections, disposed inside the package intended for filling during the filling process. Given such a configuration, where the vibrating device is disposed inside the package at least in sections during the filling process, using a poker vibrator is in particular advantageous. If no poker vibrator in the package is provided, for example if an external vibrator and/or a bottom vibrator is used, a blade or another type of antipole may be alternatively introduced into the package and/or positioned behind the package. Providing an antipole in the package may be advantageous, depending on the configuration, since this allows to achieve a narrow distance between the capacitive sensor and the antipole. Alternately it is also possible for the vibrating device to be provided for example as a plate-shaped external vibrator, and in this configuration, for the vibrating device to also operate as an antipole to the capacitive sensor, which is then disposed external of the package.

Preferably, at least one adjustment device is provided to adjust the sensitivity of the sensor device. It is in particular preferred to allow setting the sensor device so that it detects as the fill level, not the bulk material dropping into the bag, respectively not the filling stream, but only the actual fill level. For example, a potentiometer may set the sensitivity of the sensor devices so that for example a capacitive sensor does not detect the trickling respectively dropping respectively running in of bulk material, as the fill level.

Preferably at least one weighing device is provided. A weighing device may serve to monitor and possibly also control the filling of a package, in particular in gross systems. For example, a higher filling speed may be employed until a predetermined weight is reached, or until a predetermined fill level is detected. Moreover, the end weight of the package can be detected, so that the filling process is terminated accordingly. In net systems, a weighing device may also be employed to monitor the filling of the bulk material into the package by weight.

The packaging machine according to the invention comprises at least one filling unit according to any of the preceding claims.

The packaging machine according to the invention also offers the advantages described above regarding the filling unit according to the invention.

The method according to the invention for filling a package with bulk material by means of a packaging machine including at least one filling unit, as described above, is characterized by the following steps in a suitable sequence. Bulk material is filled into a package until the second fill level, i.e. the higher fill level, is detected. Thereafter the filling stream is reduced until the first fill level is reached and detected. Reducing is in particular also understood to mean, interrupting the filling stream, or a quantitative reduction of the filling stream. As soon as the first fill level is detected, the filling stream is increased again, until the second fill level, or alternately a predetermined end weight of the package, is detected. The steps of reducing and raising the fill level are repeated until the predetermined filled weight of the package is reached.

The method according to the invention for filling a package offers the advantages described above regarding the packaging machine and the filling unit.

Preferably, at least while reducing the filling stream, the bulk material in a package is compacted by means of the vibrating device. Thus, in particular during an interruption of the filling stream, settling respectively compaction of the bulk material in the package can be effectively achieved. Depending on the configuration, the bulk material in the package can be compacted continuously or indexed, during feeding as well.

Preferably, the filling stream is interrupted during respectively for the reduction of the filling stream. Interrupting the filling stream allows to achieve particularly fast settling of the fill level from the second fill level to the first fill level. This achieves in particular an indexed filling of the package.

Particularly preferably the fill level of the bulk material in the package is levelled off between the first and second fill levels, by regulating the filling stream by means of the control device. This allows to achieve continuous filling of the package, wherein the fill level in the package does not rise above the second, higher fill level.

In useful configurations, the settings for the filling stream are taken over for subsequent packages, and modified as required. Thus, for example in product changes, an optimal regulation of the filling stream can be determined while filling the first package, which is then applied to the following packages, wherein the sensor devices effectively prevent misfilling and in particular overfilling the package.

Further advantages and features of the present invention can be taken from the exemplary embodiments which will be discussed below with reference to the enclosed figures.

Figure 2:
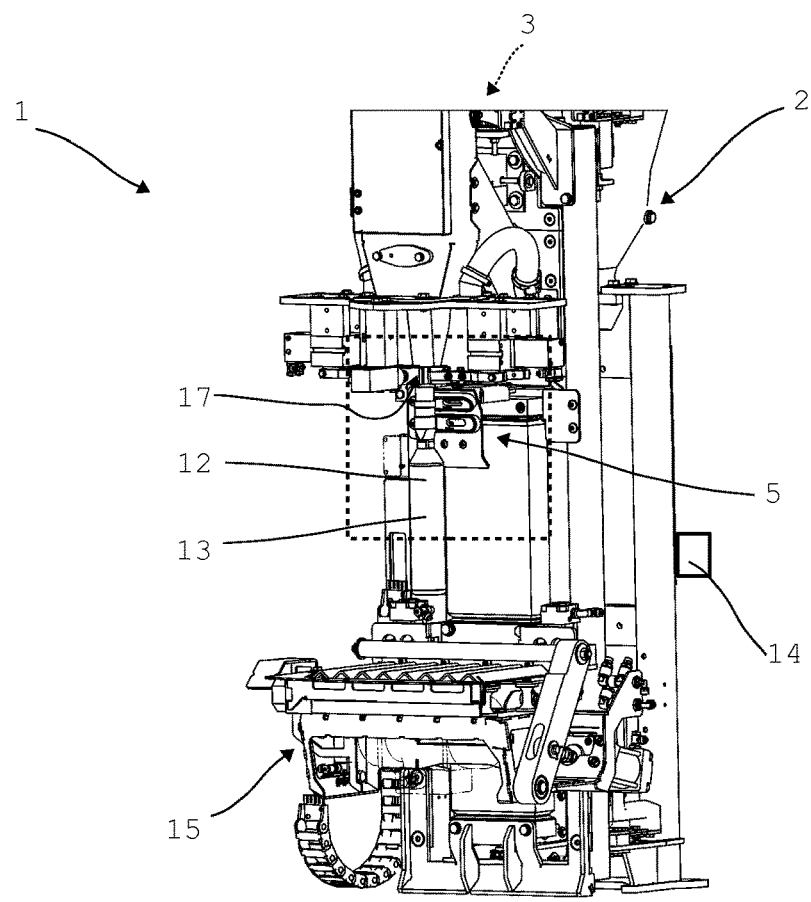
Figure 3:
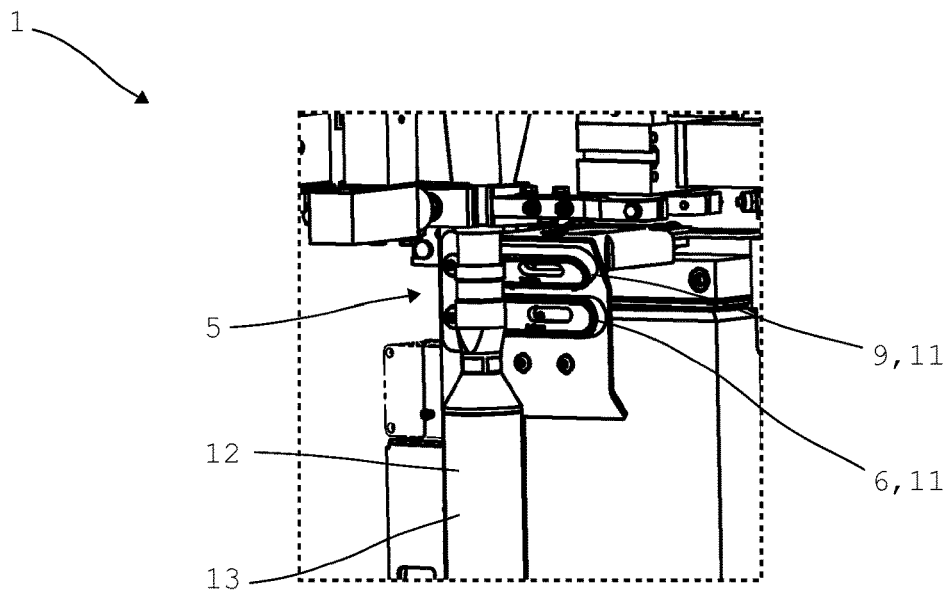
Figure 4:
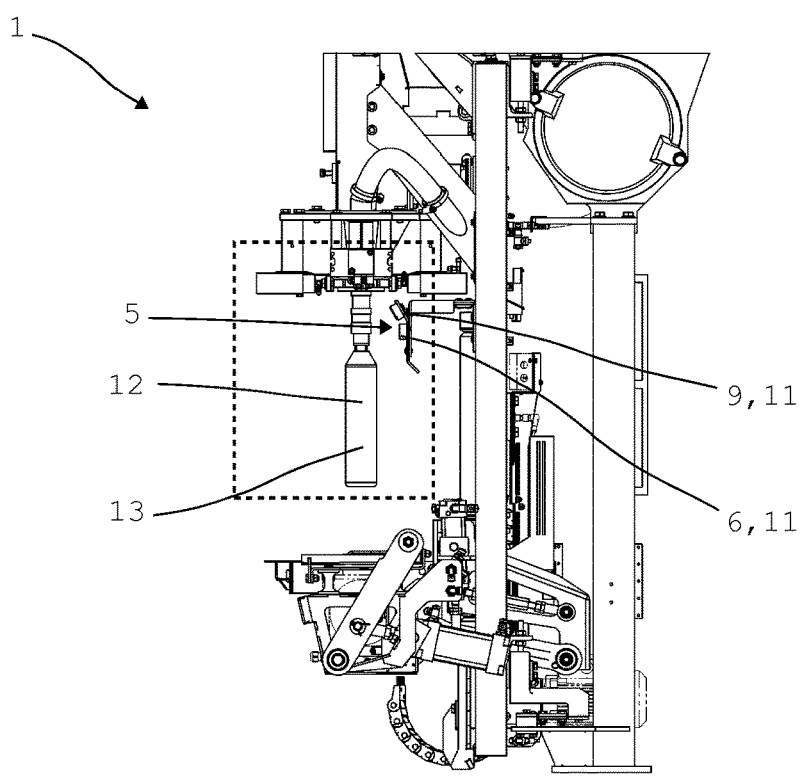
Figure 5:
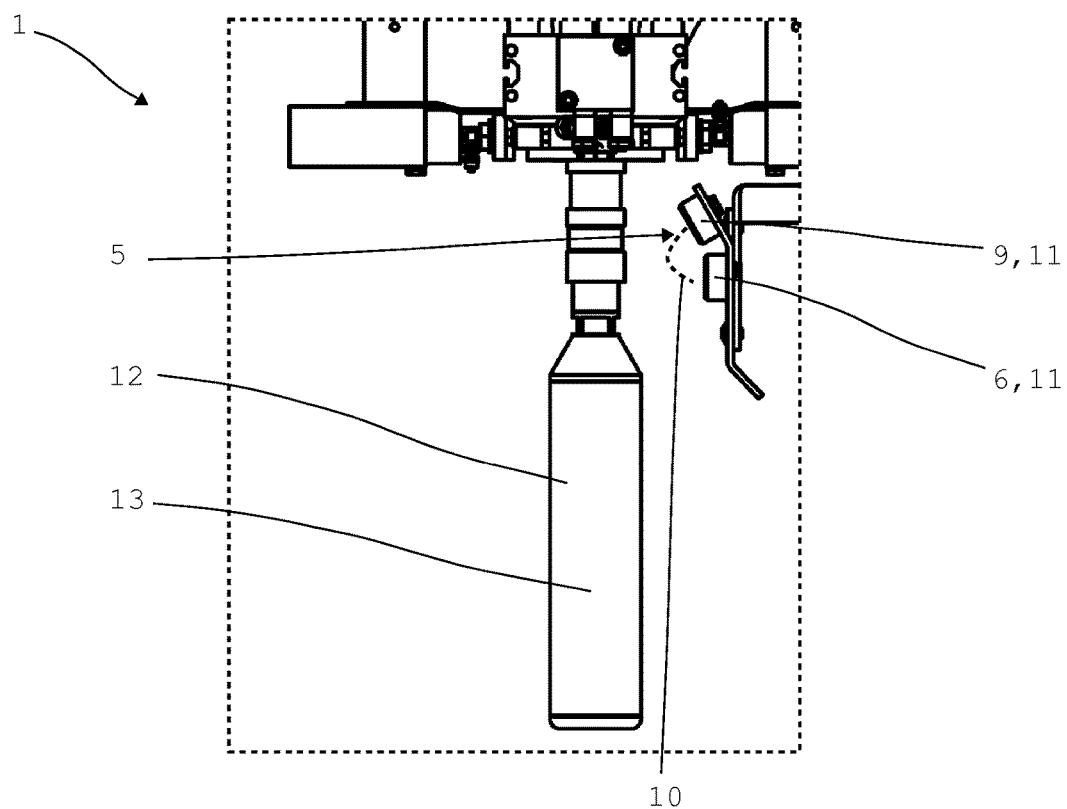
Figure 6:
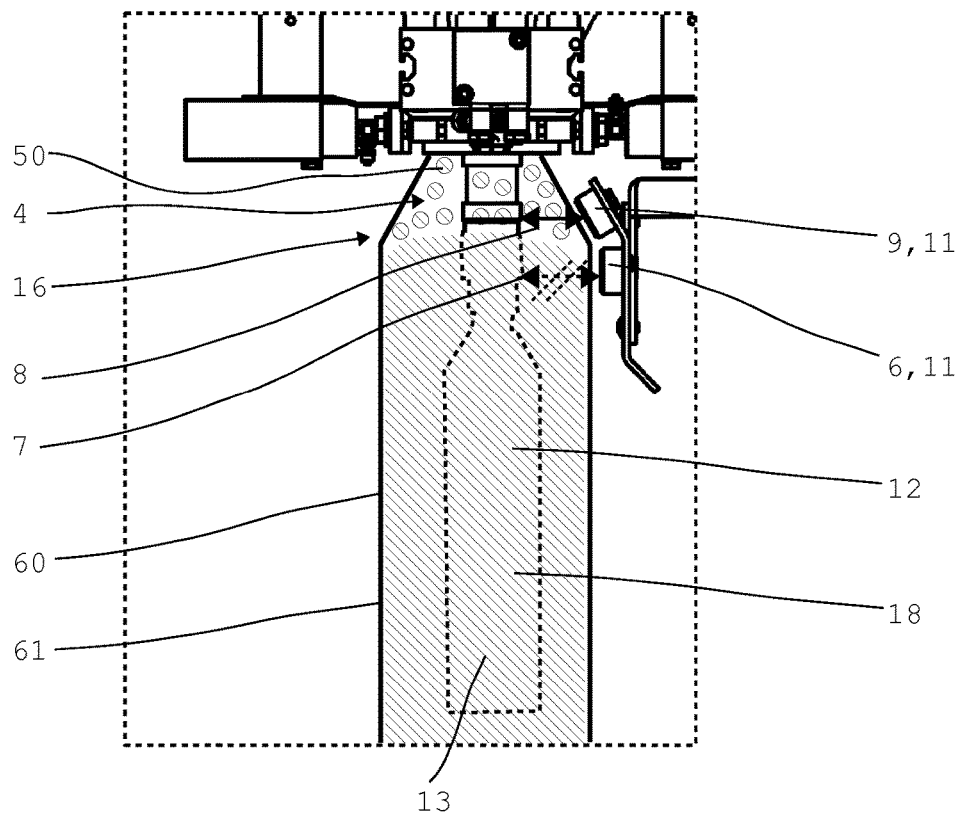

These show in:

FIG. 1 a schematic top view of an exemplary embodiment of a packaging machine according to the invention;

FIG. 2 a schematic, perspective view of an exemplary embodiment of a filling unit according to the invention;

FIG. 3 an enlargement of the area shown in broken lines in FIG. 2;

FIG. 4 a schematic side view of the filling unit according to FIG. 2;

FIG. 5 an enlargement of the area shown in broken lines in FIG. 4;

FIG. 6 the illustration according to FIG. 4 including a package during the filling process.

FIG. 1 schematically illustrates a packaging machine 100 according to the invention, presently provided as a rotary packaging machine 100, comprising multiple filling units 1 according to the invention distributed over the circumference.

The package feeder 105 feeds single empty packages 60 to one filling unit 1 at the position 101, by means of a transfer device 104. The empty package 60, which is as a rule filled during a rotation of the packaging machine 100, is transferred to a conveying member 103 by a discharge device 106, in the exemplary embodiment shown, at the position 102.

FIG. 2 schematically illustrates a perspective, oblique front view, of a filling unit 1 according to the invention for a packaging machine according to the invention.

In the exemplary embodiment shown, a package 60, in this case an open-mouth bag 61, is fed to the filling unit 1, respectively engaged with a filling spout 17 in a functional connection. The illustration does not show the package 60 in detail. The bulk material 50 is fed into the open-mouth bag 61 from above.

The bulk material 50 is being fed by means of a conveyor device 2, wherein the control device 3 can control the filling stream 4.

In order to ensure efficient filling of the package 60, a fill level sensor device 5 is provided according to the invention, in the exemplary embodiment shown comprising two sensor devices 6, 9. In the exemplary embodiment shown, these two sensor devices 6, 9 allow to determine respectively detect a first fill level 7 and a second fill level 8.

The sensor devices 6, 9 may differ in their configurations. For example, at least one sensor device 6, 9 may be configured as, respectively comprise, a camera and/or a laser. This is advantageous in particular if the wall of the package 60 is transparent, so that the fill level may be determined by means of an optical sensor.

In the exemplary embodiment shown, the sensor devices 6, 9 comprise one capacitive sensor 11 each, which detect the electromagnetic field between an antipole 13 and the capacitive sensor 11.

Furthermore the filling unit 1 according to the invention in the exemplary embodiment shown comprises a weighing device 15, which allows to determine the total weight of the package 60 intended for filling. Thus, a predetermined fill quantity in the package 60 can be detected, so that the filling process is terminated with a package containing a defined fill.

Alternately, a fill quantity can be weighed first, and only this quantity is fed to the package. Then, regulation is provided by volume only, until the entire, predetermined fill quantity is present in the package.

Furthermore, FIG. 2 schematically illustrates that an adjustment device 14 is provided to set and adjust the sensitivity of the sensor devices 6, 9. Thus, the sensitivity can in particular be matched to the bulk material 50 intended for filling.

The antipole 13 to the sensor device 6, 9 respectively to the capacitive sensors 11 may be disposed external or internal of the package 60. In the exemplary embodiment shown, a vibrating device 12 is provided, which is presently configured as a poker vibrator 18. This poker vibrator 18 is positioned inside the package 60 during the filling process, and when activated, causes compaction of the bulk material 50 in the package 60.

In the exemplary embodiment shown, the antipole 13 is provided by the poker vibrator 18 respectively the vibrating device 12. Thus, the antipole 13 in the exemplary embodiment shown is disposed inside the package 60 respectively the open-mouth bag 61.

Inserting the antipole 13 in the package 60 offers advantages, in relation to the configuration. An advantage is for example that the antipole 13 can be relatively closely approached to the capacitive sensors 11. Alternately, a vibrating device 12 disposed external of the package 60 may be provided. In the case of an external vibrator, it may for example be provided as a plate on the side external of the package 60, and may serve as an antipole 13 to at least one capacitive sensor 11.

As has been described, the exemplary embodiment shown provides the antipole 13 by way of the poker vibrator 18. In this configuration, bulk material 60 passes through between the capacitive sensor 11 and the antipole 13 during filling, respectively bulk material drops into the open-mouth bag 61, passing a region between the capacitive sensors 11 and the antipole 13.

This is why in the exemplary embodiment shown, an adjustment device 14 is provided by means of which the sensitivity of the capacitive sensors 11 can be set and adjusted. The settings in particular cause the capacitive sensors to detect the actual fill level 7, 8, not the bulk material dropping in.

Other types of sensors and other configurations of an antipole 13 also provide for advantageous use of an adjustment device 14 so as to modify the sensitivity of the sensor devices.

FIG. 3 schematically illustrates an enlargement of the detail shown in broken lines in FIG. 2. Again, one recognizes the fill level sensor device 5, in the exemplary embodiment shown comprising two sensor devices 6, 9, provided by capacitive sensors 11.

The same exemplary embodiment is schematically illustrated in a side view in the FIGS. 4 and 5. FIG. 5 shows an enlargement of the area shown in broken lines in FIG. 4.

Again, one can recognize in these illustrations the fill level sensor device 5, provided by two capacitive sensors 11. The antipole 13 to the capacitive sensors 11 provides a vibrating device 12, presently a poker vibrator 18, which is disposed inside the package 60 while bulk material 50 is filled in.

In FIG. 5 one can particularly well recognize that the two sensor devices 6, 9 are disposed at an angle 10 to one another in the exemplary embodiment shown. In the exemplary embodiment shown, this specific configuration at an angle 10 results from the contour of the package 60 used. It is preferred for the sensor devices 6, 9 to be disposed the closest possible to the wall of the package 60.

FIG. 6 schematically illustrates, in a modification of the FIG. 5, the operating principle of the filling unit 1 respectively the fill level sensor device 5. The sensor devices 6, 9 are disposed such that the head space 16, i.e. the top region of the package 60, is monitored.

A package 60, in the exemplary embodiment shown, an open-mouth bag 61 of a flexible material, is appended to a filling spout 17 respectively disposed beneath a filling spout.

The vibrating device 12 respectively the poker vibrator 18 is disposed inside the appended open-mouth bag 61. The poker vibrator 18 represents the antipole 13 to the capacitive sensors 11.

Bulk material 50 is filled into the open-mouth bag 61 from above, by means of the conveyor device 2 and controlled by the control device 2. Thus, the fill level inside of the package 60 changes.

The sensitivity of the sensor devices 6, 9 respectively the capacitive sensors 11 is set and adjusted by means of the adjustment device 14, such that the sensor devices 6, 9 do not detect as changes to the fill level, the bulk material 50 falling through between the capacitive sensors 11 and the antipole 13.

As the fill level rises, so that there is bulk material 50 present between the antipole 13 and the lower sensor device 6, the electromagnetic field prevailing between the lower sensor device 6 and the antipole 13 decreases to such a degree that the sensor device 6 determines a first fill level 7.

FIG. 6 illustrates that the fill level has not yet risen to that height, and the bulk material 50 is present between the second sensor device 9 and the antipole 13. Thus, the sensor device 9 does not yet detect the second fill level 8, and filling continues. When the fill level continues to rise until the second fill level 8 is detected, the control device 3 causes reduction respectively interruption of the filling stream 4.

It is thus achieved that the package 60 cannot be overfilled. Now, depending on the configuration and supported by the vibrating device 12, the further settling respectively compacting of the bulk material 50 is waited for. Then, as the fill level drops from the second detected fill level 8 down to the first fill level 7, the filling stream 4 is increased respectively reactivated, so as to continue filling bulk material 50 into the package 60. During the filling pauses or continuously, the vibrating device 12 can cause compaction of the bulk material 15 in the package 60.

As the fill level continues to rise, and the second fill level 8 is detected once again, the filling stream 4 is again interrupted respectively reduced. Then these steps are repeated, until for example a predetermined filled weight of the package is detected, or all of the previously weighed product is in the package 60.

Depending on the configuration, indexed filling of the package 60 can be achieved. However, depending on the configuration, the fill level may be levelled off between the first fill level 7 and the second fill level, so as to achieve continuous filling of the package 60.

LIST OF REFERENCE NUMERALS

1 filling unit
2 conveyor device
3 control device
4 filling stream
5 fill level sensor device
6 sensor device
7 first fill level
8 second fill level
9 sensor device
10 angle
11 capacitive sensor
12 vibrating device
13 antipole
14 adjustment device
15 weighing device
16 head space
17 filling spout
18 poker vibrator
50 bulk material
60 package
61 open-mouth bag
100 packaging machine
101 position
102 position
103 conveying member
104 transfer device
105 package feeder
106 discharge device

The invention claimed is:

1. Filling unit for a packaging machine for filling bulk materials into packages, comprising at least one conveyor device, by means of which bulk materials can be conveyed into a package, and at least one control device, which is suitable and configured to guide a filling stream into a package,
characterized in
that at least one fill level sensor device including at least two sensor devices is provided, which is suitable and configured to detect at least one first fill level and at least one second fill level of bulk materials in a package, wherein the first fill level corresponds to a lower fill level than the second fill level, wherein the first sensor device detects the first fill level, and wherein the second sensor device detects the second fill level and wherein the control device regulates the filling stream by way of the fill levels determined by the sensor device, wherein the control device is suitable and configured to level off the fill level of the bulk material in the package by regulating the filling stream between the first fill level and the second fill level.

2. The filling unit according to claim 1, characterized in that the sensor device is suitable and configured to monitor at least the head space of a package.

3. The filling unit according to claim 1, characterized in that the sensor devices are disposed at an angle to one another.

4. The filling unit according to claim 1, characterized in that at least one sensor device comprises at least one capacitive sensor.

5. The filling unit according to claim 4, characterized in that at least one vibrating device is provided, which is suitable and configured to compact bulk material in a package, and characterized in that during the filling process, the vibrating device is disposed at least in sections inside the package intended for filling, and that the vibrating device forms at least one antipole to the capacitive sensor.

6. The filling unit according to claim 4, characterized in that during the filling process, at least one blade and/or at least one plate is disposed at least in sections in and/or behind the package intended for filling, and that the blade and/or the plate forms at least one antipole to the capacitive sensor.

7. The filling unit according to claim 1, characterized in that at least one vibrating device is provided, which is suitable and configured to compact bulk material in a package.

8. The filling unit according to claim 1, characterized in that at least one adjustment device is provided to set and adjust the sensitivity of the sensor device.

9. The filling unit according to claim 1, characterized in that at least one weighing device is provided.

10. Packaging machine, comprising at least one filling unit according to claim 1.

11. Method for filling packages with bulk material by means of a packaging machine according to claim 10, characterized by the following steps in a suitable sequence:
    filling bulk material into a package until the second fill level is detected
    reducing the filling stream, until the first fill level is reached and detected
    increasing the filling stream, until the second fill level is detected;
so that the fill level of the bulk material in the package is levelled off by regulating the filling stream between the first fill level and the second fill level, by means of the control device.

12. The method according to claim 11, characterized in that at least during reduction of the filling stream, the bulk materials in the package are compacted by the vibrating device.

13. The method according to claim 11, characterized in that during reduction of the filling stream, the filling stream is interrupted.

14. The method according to claim 11, characterized in that the settings for the filling stream for subsequent packages are taken over and modified as required.

15. The method according to claim 11, further comprising the step of repeating the steps of (a) reducing the filling stream, until the first fill level is reached and detected and (b) increasing the filling stream, until the second fill level is detected, until a predetermined filled weight of the package is reached.

* * * * *